United States Patent Office 3,367,979
Patented Feb. 6, 1968

3,367,979
MANUFACTURE OF BIS-PHENOLS
Donald Harper and Arthur Lambert, Manchester, England, assignors to Imperial Chemical Industries Limited, London, England, a corporation of Great Britain
No Drawing. Filed Jan. 29, 1965, Ser. No. 429,134
Claims priority, application Great Britain, Feb. 5, 1964, 4,881/64
8 Claims. (Cl. 260—619)

ABSTRACT OF THE DISCLOSURE

A process for producing substantially pure bis-1:1-(2'-hydroxy-3':5'-dimethylphenyl) alkanes wherein the alkane group contains from 7–12 carbon atoms, by interacting a 2:4-dimethylphenol containing dialkylphenols in which the alkyl groups are not in the 2 and 4 positions with an aliphatic aldehyde containing between 7–12 carbon atoms. The reaction is carried out in the presence of an acidic catalyst at a temperature between 60–180° C. and in the presence of a solvent such as an alkanol, an aliphatic hydrocarbon, a cycloaliphatic hydrocarbon or an olefinic hydrocarbon.

---

This invention relates to a process for the manufacture in substantially pure form of certain bis-phenols.

Bis-1:1-(2'-hydroxy-3':5' - dimethylphenyl)alkanes are useful antioxidants for example for natural and synthetic rubbers. These compounds have hitherto been manufactured by the interaction of 2:4-dimethylphenols and aldehydes in presence of an acid catalyst, but this method of manufacture requires the availability in substantially pure form of 2:4-dimethylphenol. This phenol as normally obtained contains considerable amounts of other phenols which cannot readily be removed from the 2:4-dimethylphenol, and use of the impure dimethylphenol affords bis-1:1-(2'-hydroxy-3':5'-dimethylphenyl)alkanes containing impurities which are for many purposes undesirable and which are not easy to remove. A particular example of such impure 2:4-dimethylphenol is the commercially available 65:35 mixture of 2:4- and 2:5-dimethylphenol.

It has now been discovered that in the case of the bisphenols derived from certain higher aldehydes the bis-1:1-(2'-hydroxy - 3':5' - dimethylphenyl)alkanes can be readily isolated in substantially pure form from crude product obtained from 2:4-dimethylphenol containing these other phenols by extraction of the impurities with certain solvents.

According to the invention therefore there is provided a process for the manufacture in substantially pure form of bis-1:1-(2' - hydroxy - 3':5' - dimethylphenyl)alkanes wherein the alkane group contains from 7 to 12 carbon atoms which comprises interacting a 2:4-dimethylphenol containing dialkylphenols in which the alkyl groups are not in the 2 and 4 positions with an aliphatic aldehyde containing between 7 and 12 carbon atoms in presence of a catalyst and treating the crude product with a solvent consisting of an alcohol, an alkyl ester, an aliphatic, cycloaliphatic, aromatic or olefinic hydrocarbon, a chlorosubstituted derivative of such a hydrocarbon, or a mixture of any number of such solvents.

Aldehydes which are suitable for use in the process of the invention include n-heptaldehyde and particularly 3,5,5-trimethylhexan-1-al.

The catalyst used in the process of the invention are those conventionally used in the manufacture of crude phenol/aldehyde condensation products, for example acidic compounds such as hydrogen chloride, hydrochloric acid or Friedel-Crafts catalysts.

The condensation of the dimethylphenol and the aldehyde may be carried out by any conventional procedure, for example by heating the reactants and catalyst at a temperature between 60° and 180° C. and preferably between 90° C. and 110° C. The reaction mixture may be diluted if desired by, for example, an aliphatic or cycloaliphatic hydrocarbon but this usually causes some reduction in yield.

As solvent there may be mentioned especially an alcohol particularly a lower alcohol such as methanol, ethanol, isopropanol, n-propanol, butanol or amyl alcohol, or a hydrocarbon such as an aliphatic hydrocarbon for example petroleum ether, pentane, hexane, octane or decane, or a cycloaliphatic hydrocarbon such as cyclohexane or cyclopentane or an olefinic hydrocarbon such as diisobutylene or commercially available mixtures of such hydrocarbons. Other solvents such as alkyl esters for example methyl acetate, ethyl acetate, ethyl formate or amyl acetate, aromatic hydrocarbons for example benzene or toluene or chlorinated hydrocarbons for example chloroform, dichloroethane or 1,1,1-trichloroethane may also be used but these other solvents have the disadvantage of dissolving a not inconsiderable part of the desired product and therefore providing lower yields.

The product may be treated with the solvent in any convenient way. A preferred procedure is to add the solvent after completion of reaction at about 50° C. with stirring followed by cooling, for example to below 10° C. after which the solid product is collected, for example by filtration. It is desirable to wash the solid product with further cold solvent, after which the product can be dried by any conventional method.

The amount of solvent necessary will depend upon the quantities and type of impurity present in the 2,4-dimethylphenol and the degree of purity desired. Small amounts of solvent will produce bis-1,1-(2'-hydroxy-3',5'-dimethylphenyl)alkanes from which substantially all impurities have not been removed, whilst large amounts of solvent will give lower yields owing to loss of the product in solution.

The pure bis-1,1-(2'-hydroxy-3',5'-dimethylphenyl)alkanes so obtained are particularly useful as antioxidants because of their improved antioxidant and staining characteristics in comparison with the crude compound. In particular these compounds do not stain rubber itself or produce a migration stain in for example, plasticised polyvinyl chloride. Furthermore these compounds are obtained in a form which being solid and crystalline is more easily handled than the low melting resinous crude compounds.

The invention is illustrated but not limited by the following examples in which all parts and percentages are by weight unless otherwise stated.

Example 1

60 parts of a 65:35 mixture of 2,4- and 2,5-dimethylphenols, are heated for 12 hours at a temperature between 100 and 105° C. with 30 parts of nonaldehyde (3:5:5-trimethylhexan-1-al, 90%) and 17 parts of 35% aqueous hydrochloric acid. The reaction mixture is cooled to about 50° C., 60 parts of petroleum ether are added with stirring and the mixture further cooled to below 10° C. The solid product is collected by filtration, washed with a further 40 parts of petroleum ether, and dried. The 3:5:5-trimethyl-bis-1:1-(2'-hydroxy-3':5' - dimethylphenyl)hexane so obtained is a white solid melting between 165° and 168° C.

Example 2

60 parts of a 65:35 mixture of 2:4- and 2:5-dimethylphenols are heated for 12 hours at a temperature between 100 and 105° C. with 40 parts of nonaldehyde (3:5:5- trimethylhexan-1-al, 90%) and 17 parts of 35% aqueous hydrochloric acid. The reaction mixture is cooled to around 50° C., 60 parts of petroleum ether are added with stirring and the mixture is further cooled to below 10° C. The solid product is collected by filtration, washed with a further 40 parts of petroleum ether, and dried. 45 parts of 3:5:5-trimethyl-1:1-bis-(2' - hydroxy - 3':5' - dimethylphenyl)-hexane are obtained as an off-white solid melting between 157° and 167° C.

*Example 3*

60 parts of a phenolic mixture containing 80% 2:4-dimethylphenol are heated for 12 hours at a temperature between 100 and 105° C., with 36 parts of nonaldehyde (3:5:5-trimethylhexan-1-al, 90%) and 17 parts of 35% aqueous hydrochloric acid. The reaction mixture is cooled to around 50° C., 60 parts of petroleum ether are added with stirring and the mixture further cooled to below 10° C. The solid product is collected by filtration, washed with a further 40 parts of petroleum ether, and dried. 59 to 60 parts of 3:3:5-trimethyl-1:1-bis-(2'-hydroxy-3':5'-dimethylphenyl)hexane are obtained as a white solid melting between 162° and 166° C.

*Example 4*

60 parts of a phenolic mixture containing 90% of 2:4-dimethylphenol are heated for 12 hours at a temperature between 100 and 105° C. with 40 parts of nonaldehyde (3:5:5-trimethylhexan-1-al, 90%) and 17 parts of 35% aqueous hydrochloric acid. The reaction mixture is cooled to around 50° C., 60 parts of petroleum ether are added with stirring and the mixture further cooled to below 10° C. The said product is collected by filtration, washed with a further 40 parts of petroleum ether, and dried. 69 parts of 3:3:5-trimethyl-1:1-bis-(2'-hydroxy - 3':5' - dimethylphenyl)hexane are obtained as a white solid melting between 165 and 168° C.

*Example 5*

61 parts of a 65:35 mixture of 2:4- and 2:5-dimethylphenols are heated for 12 hours at a temperature between 100 and 105° C. with 32 parts of n-heptaldehyde (90%) and 17 parts of 35% aqueous hydrochloric acid. The reaction mixture is cooled to around 50° C., 60 parts of petroleum ether are added with stirring and the mixture is further cooled to below 10° C. The solid product is collected by filtration, washed with a further 40 parts of petroleum ether, and dried. 25 parts of 1:1-bis-(2'-hydroxy-3':5'-dimethylphenyl)heptane are obtained as a white solid melting between 128 and 130° C.

*Example 6*

60 parts of a 65:35 mixture of 2:4- and 2:5-dimethylphenols are heated for 12 hours at a temperature between 100 and 105° C. with 30 parts of nonaldehyde (3:5:5-trimethylhexan-1-al, 90%) and 17 parts of 35% aqueous hydrochloric acid. The reaction mixture is cooled to about 50° C., 80 parts of methyl alcohol are added with stirring and the mixture further cooled to below 10° C. The solid product is collected by filtration, washed with a further 20 parts of methyl alcohol, and dried. The 3:5:5-trimethyl-bis-1:1-(2'-hydroxy-3':5' - dimethylphenyl)hexane so obtained is a white solid melting between 165° and 168° C.

What we claim is:

1. A process for the manufacture in substantially pure form of bis-1:1-(2'-hydroxy - 3':5' - dimethylphenyl)alkanes wherein the alkane group contains from 7 to 12 carbon atoms which comprises interacting a 2:4-dimethylphenol containing as impurities dialkyl phenols in which the alkyl groups are not in the 2 and 4 positions with an aliphatic aldehyde containing between 7 and 12 carbon atoms in the presence of an acidic catalyst at a temperature between 60–180° C. and cooling the resulting crude product to at least about 50° C. and adding thereto a solvent selected from the group consisting of a lower alkanol and an aliphatic hydrocarbon, further cooling said solvent treated crude product to below about 10° C. and collecting solid bis-1:1-(2'-hydroxy-3':5' - dimethylphenyl)alkanes.

2. A process as claimed in claim 1 wherein the aldehyde is n-heptaldehyde.

3. A process as claimed in claim 1 wherein the aldehyde is 3:5:5-trimethylhexane-1-al.

4. A process as claimed in claim 1 wherein the 2:4-dimethylphenol contains 2:5-dimethylphenol.

5. A process as claimed in claim 1 wherein the solvent is an aliphatic hydrocarbon.

6. A process as claimed in claim 5 wherein the solvent is petroleum ether.

7. A process as claimed in claim 1 wherein the solvent is a lower alkanol.

8. A process as claimed in claim 7 wherein the solvent is methanol.

References Cited

UNITED STATES PATENTS

| | | | |
|---|---|---|---|
| 2,675,366 | 4/1954 | Pullman | 260—619 X |
| 2,845,464 | 7/1958 | Luten | 260—619 |
| 3,073,868 | 1/1963 | Prahl et al. | 260—619 |
| 3,207,795 | 9/1965 | Prahl et al. | 260—619 |

LEON ZITVER, *Primary Examiner.*

H. ROBERTS, *Assistant Examiner.*